United States Patent
Adachi et al.

(10) Patent No.: US 7,544,444 B2
(45) Date of Patent: Jun. 9, 2009

(54) ALKALINE DRY BATTERY AND METHOD FOR EVALUATING SEPARATOR FOR USE IN ALKALINE DRY BATTERY

(75) Inventors: Mitsuji Adachi, Suita (JP); Yasuhiko Shoji, Higashiosaka (JP); Seiji Wada, Katano (JP)

(73) Assignee: Panasonic Corporation, Osaka (JP)

( * ) Notice: Subject to any disclaimer, the term of this patent is extended or adjusted under 35 U.S.C. 154(b) by 794 days.

(21) Appl. No.: 11/167,430

(22) Filed: Jun. 28, 2005

(65) Prior Publication Data

US 2006/0003224 A1    Jan. 5, 2006

(30) Foreign Application Priority Data

Jun. 30, 2004    (JP)    .............................. 2004-194395

(51) Int. Cl.
*H01M 2/14*    (2006.01)
*G01N 3/00*    (2006.01)

(52) U.S. Cl. .......................... 429/247; 429/249; 73/838

(58) Field of Classification Search ................. 429/129, 429/130, 142, 144, 145, 247, 249; 72/838, 72/839, 840
See application file for complete search history.

(56) References Cited

U.S. PATENT DOCUMENTS

| | | | | | |
|---|---|---|---|---|---|
| 4,288,503 | A | * | 9/1981 | Goldberg | 429/145 |
| 4,812,145 | A | * | 3/1989 | LaBonte | 429/249 X |
| 5,202,178 | A | * | 4/1993 | Turner | 429/247 X |
| 2002/0160259 | A1 | * | 10/2002 | Kinn et al. | 429/144 |

FOREIGN PATENT DOCUMENTS

| | | |
|---|---|---|
| JP | 06-231746 | 8/1994 |
| JP | 2000-090939 | 3/2000 |

OTHER PUBLICATIONS

Japanese Office Action issued in Japanese Patent Application No. JP 2004-194395 dated Jan. 29, 2009.

* cited by examiner

*Primary Examiner*—Stephen J. Kalafut
(74) *Attorney, Agent, or Firm*—McDermott Will & Emery LLP

(57) ABSTRACT

An alkaline dry battery having high reliability is provided by using a separator that has excellent drop impact resistance when impregnated with an alkaline electrolyte. In the alkaline dry battery according to the present invention, an electrolyte solution is an alkaline aqueous solution containing 30 to 40% by weight of potassium hydroxide, and a separator impregnated with the alkaline aqueous solution has a burst index within a range of 2 to 10 $kPa/(g/m^2)$.

2 Claims, 1 Drawing Sheet

ALKALINE DRY BATTERY AND METHOD FOR EVALUATING SEPARATOR FOR USE IN ALKALINE DRY BATTERY

BACKGROUND OF THE INVENTION

The present invention relates to an alkaline dry battery, and more particularly to a separator to be disposed between a positive electrode and a negative electrode.

Conventionally, the physical properties of a separator for use in an alkaline dry battery has been evaluated primarily in the form of a separator base paper in a dry condition before the battery is assembled. It has been proposed, for example, for a separator base paper rolled into a hoop shape, that the ratio of the tensile strength in the longitudinal direction to the tensile strength in the width direction be set within a range of 1:1 to 2:1 (refer, for example, to Japanese Unexamined Patent Publication No. 2000-90939).

However, the strength of the separator in a wet condition after assembled in the battery, in particular, the strength of the separator impregnated with an alkaline electrolyte, differs from the strength of the separator in a dry condition. Therefore, it does not necessarily follow that the separator having high strength in a dry condition has excellent drop impact resistance.

BRIEF SUMMARY OF THE INVENTION

In view of the above problem, it is an object of the present invention to provide an alkaline dry battery having high reliability by using a separator that has excellent drop impact resistance when impregnated with an alkaline electrolyte. It is also an object of the present invention to provide a method for evaluating a separator for use in an alkaline dry battery, that can easily determine whether the base paper as the material for the separator has excellent drop impact resistance when immersed in an alkaline electrolyte.

An alkaline dry battery according to the present invention comprises: a positive electrode containing a positive electrode active material; a negative electrode containing a negative electrode active material; a separator disposed between the positive electrode and the negative electrode; and an electrolyte contained in the positive electrode, the negative electrode, and the separator, wherein the electrolyte is an alkaline aqueous solution containing 30 to 40% by weight of potassium hydroxide, and the separator impregnated with the alkaline aqueous solution has a burst index that falls within a range of 2 to 10 kPa/(g/m$^2$).

A method for evaluating a separator for use in an alkaline dry battery, according to the present invention, is characterized in that the burst index of a base paper impregnated with an electrolyte solution comprising an alkaline aqueous solution containing 30 to 40% by weight of potassium hydroxide is measured, and in that the base paper whose burst index falls within a range of 2 to 10 kPa/(g/m$^2$) is selected for use as the separator.

In other words, the method for evaluating a separator for use in an alkaline dry battery, according to the present invention, comprises the steps of:

making a base paper impregnated with an electrolyte including an alkaline aqueous solution containing 30 to 40% by weight of potassium hydroxide;

measuring a burst index of the base paper; and selecting a base paper having a burst index within a range of 2 to 10 kPa/(g/m$^2$) for use as the separator.

According to the present invention, an alkaline dry battery having high reliability can be provided by using a separator that has excellent drop impact resistance when impregnated with an alkaline electrolyte solution.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
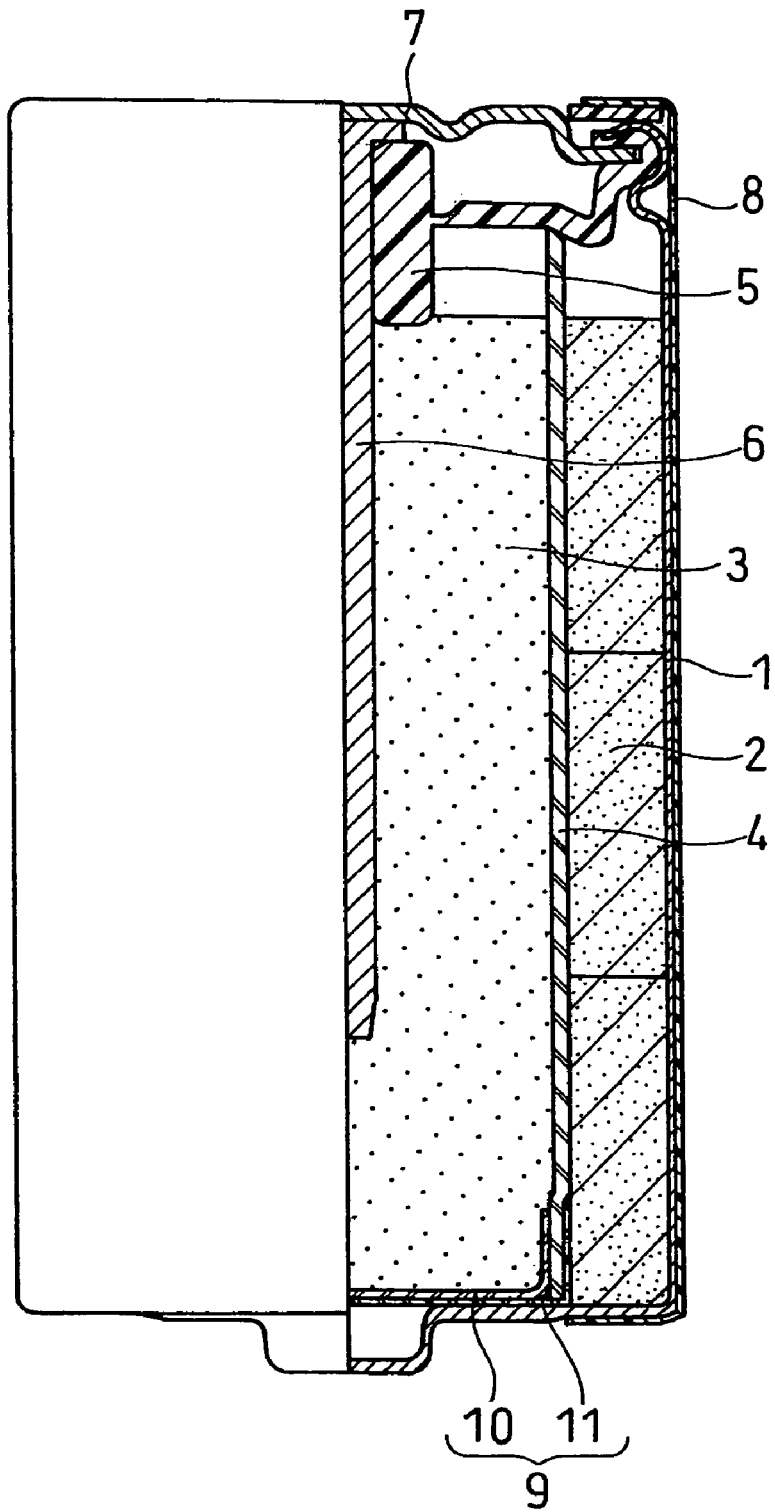
FIG. 1 is a front view, partly in cross section, of an alkaline dry battery according to the present invention.

In a general fabrication process of a battery, a separator rolled into a hoop shape is cut to the desired size while stretching it in a longitudinal direction. Accordingly, the separator is required to have a tensile strength such that the separator does not easily break during the fabrication process and yet is easy to handle. Therefore, in the prior art, it has been practiced to evaluate the separator by testing its tensile strength in a dry condition before the separator is assembled in the battery.

However, the separator assembled in the battery contains an alkaline aqueous solution as an electrolyte and, therefore, exhibits physical properties different from those of the separator in a dry condition before it is assembled in the battery; accordingly, the evaluation of the separator based on the tensile strength, as practiced in the prior art, does not necessarily apply to the separator under actual use conditions in which the separator is impregnated with an alkaline electrolyte.

Therefore, if an external impact is applied to the battery when, for example, it is accidentally dropped, the negative electrode in a high density fluid gel state may break through the separator and get into the positive electrode mixture, resulting in an internal short-circuit.

In view of the above situation, the inventor et al. conducted various studies to find ways to evaluate the separator under conditions equivalent to actual use conditions in which the separator is impregnated with an alkaline electrolyte. As a result, it has been discovered that when the separator impregnated with an aqueous solution of 30 to 40% by weight of potassium hydroxide as the electrolyte has a burst index that falls within a range of 2 to 10 kPa/(g/m$^2$), the separator exhibits excellent impact drop resistance.

If the burst index is less than 2 kPa/(g/m$^2$), there is the possibility that when the battery is dropped, the gelled negative electrode may break through the upper part of the separator and flow into the positive electrode mixture side, resulting in an internal short-circuit and thus reducing the open circuit voltage of the battery. On the other hand, if the burst index exceeds 10 kPa/(g/m$^2$), then when inserting a gasket the upper part of the separator wound in a cylindrical shape may buckle and a portion thereof may be folded outward, forming an opening in the outer circumferential portion. As a result, the gelled negative electrode may flow into the positive electrode mixture side through the opening, resulting in an internal short-circuit and thus reducing the open circuit voltage of the battery.

The burst index can be measured by a method defined in JIS P 8112. The burst index can be obtained by dividing the bursting strength of the sample piece made of paper or paper board by its grammage. The grammage of the sample piece can be measured by a method defined in JIS P 8124. The bursting strength is the maximum pressure at which the sample piece ruptures.

If the concentration of potassium hydroxide is less than 30% by weight, the amount of potassium contributing to ion conductivity becomes extremely small, and the discharge performance drops. On the other hand, if the concentration of potassium hydroxide exceeds 40% by weight, the discharge performance under heavy load conditions drops.

In fabricating the alkaline dry battery, the burst index of the base paper impregnated with an electrolyte is evaluated, and the paper that satisfies the above requirements can be selected for use as the separator. In this way, by evaluating the base paper under conditions equivalent to actual use conditions, it can be easily determined whether the base paper can be used as the separator for the alkaline dry battery.

Examples of the present invention will be described in detail below.

EXAMPLES 1 to 3 and COMPARATIVE EXAMPLES 1 to 3

The D size alkaline dry battery (LR20) shown in FIG. 1 was fabricated in accordance with the following procedure.

(1) Preparation of the Base Paper for the Cylindrically Shaped Separator

Base paper with a thickness of 200 um was prepared by fabricating a nonwoven fabric on a paper making machine by mixing vinylon, rayon, and pulp as fibers and polyvinyl alcohol as a binder in proportions shown in Table 1. The prepared base paper was cut into a rectangular shape of 55 mm×150 mm.

TABLE 1

| | Amount of each material for base paper of cylindrically shaped separator(wt %) | | | |
|---|---|---|---|---|
| | vinylon | rayon | pulp | polyvinyl alcohol |
| Comp. Ex. 1 | 35 | 30 | 30 | 5 |
| Comp. Ex. 2 | 30 | 30 | 30 | 10 |
| Ex. 1 | 25 | 35 | 30 | 10 |
| Ex. 2 | 20 | 40 | 30 | 10 |
| Ex. 3 | 20 | 35 | 30 | 15 |
| Comp. Ex. 3 | 20 | 30 | 30 | 20 |

(2) Fabrication of the Alkaline Dry Battery

Manganese dioxide as a positive electrode active material and graphite as an electrically conductive material were mixed in a ratio of 90:10 by weight. This mixture and an alkaline electrolyte were mixed in a ratio of 100:3 by weight and, after sufficiently stirring, the resulting mixture was compression molded into flakes. An aqueous solution of 40% by weight of potassium hydroxide was used as the alkaline electrolyte. Next, the positive electrode mixture in the form of flakes was pulverized into grains, which were classified through a sieve to obtain grains of 10 to 100 mesh; then, the thus obtained grains were molded under pressure into a hollow cylindrical shape to give a positive electrode mixture 2 in the form of pellets. Three pellets of the positive electrode mixture 2 were placed inside the battery case 1, and the positive electrode mixture 2 was reshaped using a pressing jig and made to firmly adhere to the inner wall of the battery case 1.

Using a cylindrically shaped prescribed jig, two sheets of the base paper prepared as earlier described were laminated and wound two turns to construct the cylindrically shaped separator 4. With the cylindrically shaped separator 4 wound around the jig, a second bottom paper 11 was placed on the tip of the jig. Then, the second bottom paper 11 and the cylindrically shaped separator 4 were inserted into the hollow space within the positive electrode mixture 2, with the second bottom paper 11 being attached so as to cover the edge of the cylindrically shaped separator 4. In this way, the cylindrically shaped separator 4 was disposed around the inner wall of the positive electrode mixture 2, and the second base paper 11 was disposed on the bottom of the battery case 1. Further, the first bottom paper 10 was attached to the tip of the jig and inserted inside the cylindrically shaped separator 4.

Here, the first bottom paper 10 was formed from a 0.5-mm thick nonwoven fabric of polyvinyl alcohol fiber cut into a square shape, each side of which was larger than the inner diameter of the cylindrically shaped separator.

On the other hand, the second bottom paper 11 was formed from a microporous film that allows only ions to pass therethrough. The microporous film was formed by laminating a nonwoven fabric of polyvinyl alcohol fiber to each side of a thin film of regenerated cellulose and by cutting the resulting base paper of 0.2 mm in thickness into a square shape, each side of which was larger than the outer diameter of the cylindrically shaped separator.

A prescribed amount of alkaline electrolyte prepared in the same manner as described above was poured into the cylindrically shaped bottomed separator 9 structure, which comprised the cylindrically shaped separator 4, and a bottom separator 9 including the first bottom paper 10 and the second bottom paper 11. After a predetermined time had elapsed, a gelled negative electrode was filled into the space inside the cylindrically shaped bottomed separator structure. The gelled negative electrode was prepared by mixing sodium polyacrylate as a gelatinizing agent, an alkaline electrolyte prepared in the same manner as described above, and zinc powder as a negative electrode active material in a ratio of 1:33:66 by weight.

A negative electrode collector 6 was inserted through the center of the gelled negative electrode 3. A gasket 5 and a bottom plate 7 which also serves as a negative electrode terminal were formed integrally with the negative electrode collector 6. Then, the edge of the open end of the battery case 1 was crimped onto the peripheral edge of the bottom plate 7 via an end portion of the gasket 5, thus sealing the open end of the battery case 1. The outer surface of the battery case 1 was covered with an outer jacket label 8.

[Evaluation]

(1) Measurement of the Burst Index of the Base Paper for the Cylindrically Shaped Separator Each base paper shown in Table 1 was cut into a square shape of 60 mm×60mm, which was then immersed for three minutes in an aqueous solution of 35% by weight of potassium hydroxide. After that, the base paper was taken out from the potassium hydroxide aqueous solution, and then left for one minute for removal of any excess potassium hydroxide aqueous solution, thus obtaining a sample. The burst index of each sample was measured using a Mullen low-pressure tester in accordance with the JIS P 8112 specification. Ten measurements were made on each sample, and the average value was obtained. Also, for base paper not impregnated with the potassium hydroxide aqueous solution, the burst index was measured in the same manner as just described.

(2) Measurement of the Tensile Strength of the Base Paper for the Cylindrically Shaped Separator Each base paper shown in Table 1 was cut into a shape of 15 mm×200 mm, and a sample was built by stacking four sheets which were impregnated with the potassium hydroxide aqueous solution in the same manner as described above. The tensile strength of each sample was measured using a constant-speed tensile strength tester in accordance with the JIS P 8113 specification. Also, for base paper not impregnated with the potassium hydroxide(KOH) aqueous solution, the tensile strength was measured in the same manner as just described.

(3) Battery Drop Test

Before conducting the test, the open circuit voltage of each battery was measured. After each battery with its bottom plate side facing downward was dropped five times from a height of 1 meter, the open circuit voltage of each battery was measured. The number of batteries whose open circuit voltage had dropped by 5 mV or more at the end of the test was counted. One hundred batteries were subjected to the test.

The results of the above measurement are shown in Tables 2 and 3.

TABLE 2

| | Relative bursting strength (kPa/(g/m$^2$)) | | Tensile strength(N/mm) | |
| --- | --- | --- | --- | --- |
| | Impregnated with KOH aqueous solution | Dry | Impregnated with KOH aueous solution | Dry |
| Comp. Ex. 1 | 0.5 | 5 | 9.5 | 35 |
| Comp. Ex. 2 | 1.0 | 10 | 9.8 | 41 |
| Ex. 1 | 2.0 | 10 | 9.5 | 40 |
| Ex. 2 | 5.0 | 20 | 10.0 | 41 |
| Ex. 3 | 10.0 | 50 | 11.0 | 50 |
| Comp. Ex. 3 | 20.0 | 50 | 15.0 | 60 |

TABLE 3

| | Number of batteries whose open circuit voltage had dropped by 5 mV or more |
| --- | --- |
| Comp. Ex. 1 | 50 |
| Comp. Ex. 2 | 20 |
| Ex. 1 | 0 |
| Ex. 2 | 0 |
| Ex. 3 | 0 |
| Comp. Ex. 3 | 10 |

In EXAMPLES 2 and COMPARATIVE EXAMPLE 2, the tensile strength was the same. However, while every battery in EXAMPLE 2 showed an open circuit voltage drop of less than 5 mV, in COMPARATIVE EXAMPLE 2 there were batteries whose open circuit voltage had dropped by 5 mV or more. This shows that it is difficult to evaluate a separator suitable for use in a battery by relying on the tensile strength.

In EXAMPLES 1 to 3 in which the burst index of the base paper impregnated with the potassium hydroxide fell within the range of 2 to 10, every battery showed an open circuit voltage drop of less than 5 mV, from which it was seen that these batteries had good drop impact resistance. For batteries whose open circuit voltage had dropped by 5 mV or more, it was confirmed that, in any of such batteries, the gelled negative electrode had flown into the positive electrode mixture side.

As described above, the alkaline dry battery of the present invention can be applied as a power supply for a high performance small electronic apparatus, a portable apparatus, or the like.

Although the present invention has been described in terms of the presently preferred embodiments, it is to be understood that such disclosure is not to be interpreted as limiting. Various alterations and modifications will become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An alkaline dry battery comprising: a positive electrode including a positive electrode active material; a negative electrode including a negative electrode active material; a separator disposed between said positive electrode and said negative electrode; and an electrolyte solution contained in said positive electrode, said negative electrode, and said separator, wherein
    said electrolyte is an alkaline aqueous solution containing 30 to 40% by weight of potassium hydroxide, and
    said separator impregnated with said alkaline aqueous solution has a burst index within a range of 2 to 10 kPa/(g/m$^2$).

2. A method for evaluating a separator for use in an alkaline dry battery, comprising the steps of:
    making a base paper impregnated with an electrolyte including an alkaline aqueous solution containing 30 to 40% by weight of potassium hydroxide;
    measuring a burst index of said base paper; and
    selecting a base paper having a burst index within a range of 2 to 10 kPa/(g/m$^2$) for use as said separator.

* * * * *